United States Patent Office 3,485,999
Patented Dec. 23, 1969

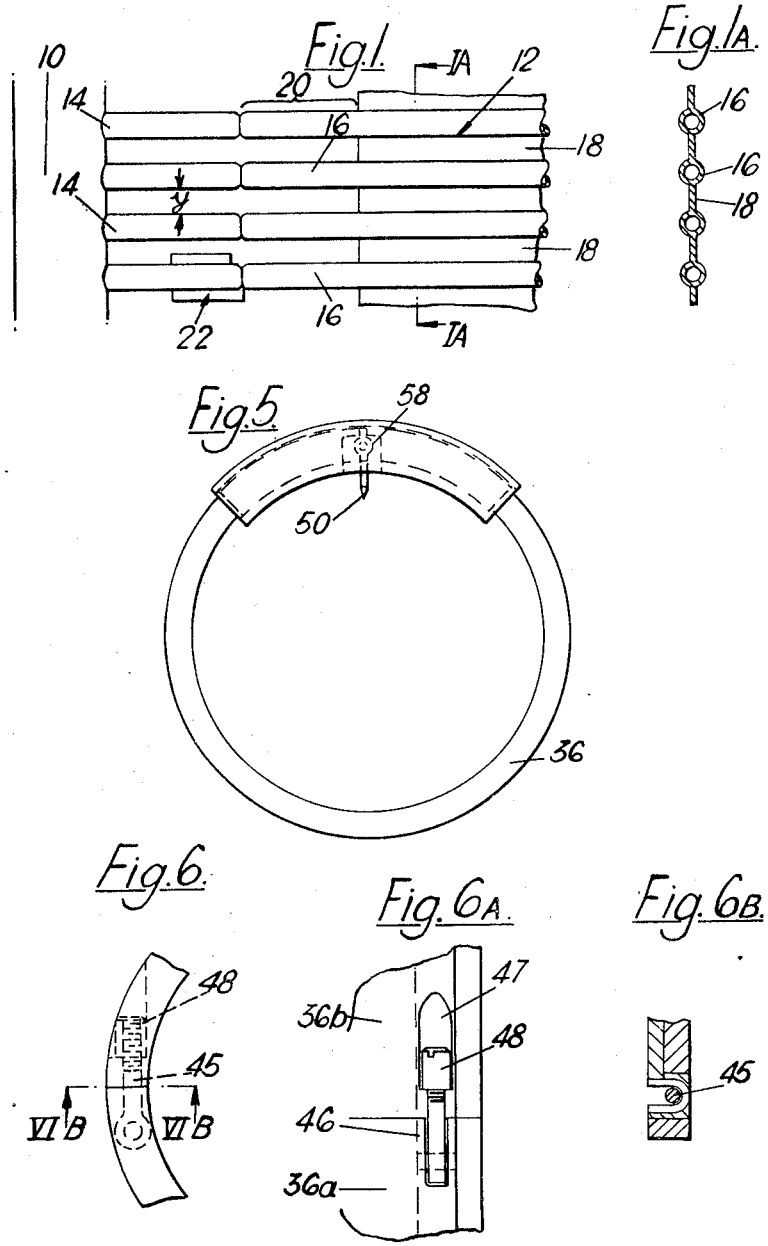

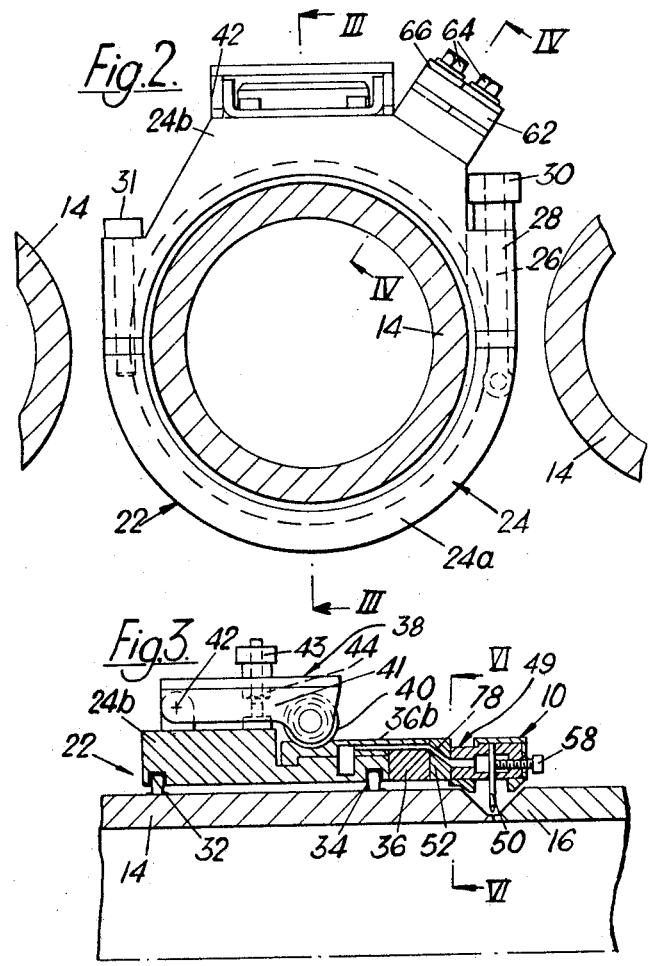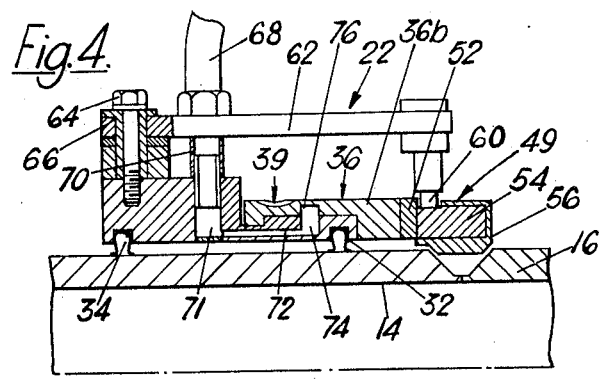

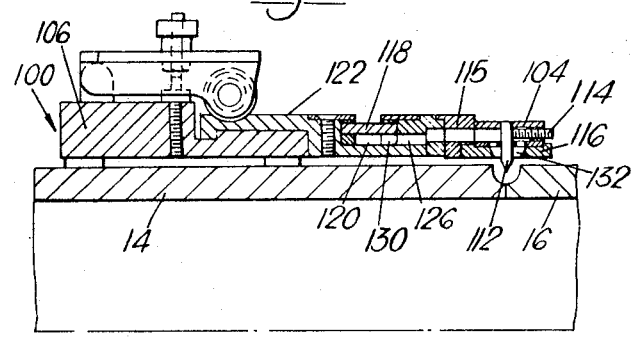
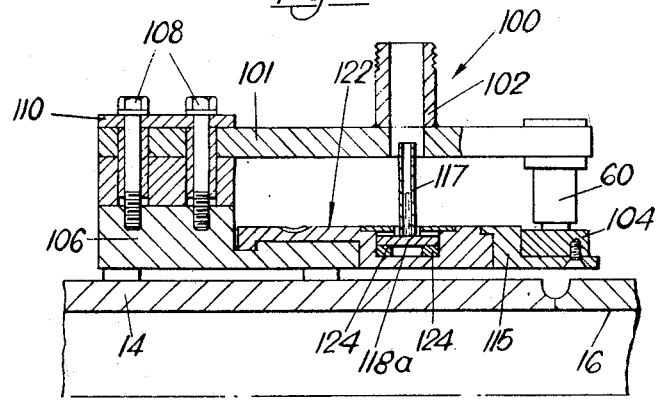

3,485,999
WELDING TORCH FOR FINNED TUBE PANELS
Alan Ernest Stevens, Wokingham, and Derek V. Brissenden, South Harrow, England, assignors to Foster Wheeler Corporation, New York N.Y., a corporation of New York
Filed Apr. 4, 1967, Ser. No. 628,419
Claims priority, application Great Britain, Apr. 4, 1966, 14,897/66
Int. Cl. B23k 9/12, 9/02
U.S. Cl. 219—125     7 Claims

ABSTRACT OF THE DISCLOSURE

This invention relates to a non-consumable electrode welding torch for the external butt welding of tubes. The torch has a clamp which grips around one tube and it carries an electrode holder which is rotatable around the tubes. Welding current for the electrode and inert shielding gas are supplied to a position on the clamp so as to avoid any trailing leads.

---

This invention relates to improvements in inert gas-shielded non-consumable electrode welding. It is especially concerned with an inert gas-shielded non-consumable electrode welding torch which in suitable for the external butt welding of tubes.

In boilers and particularly once-through boilers there is a tendency to construct the heating surfaces from tube panels. These panels consist of a number of parallel spaced tubes which are joined to one another by fins extending from diametrically opposed parts of each tube and forming a web. The use of such panels leads to a reduction and simplification in design and construction.

The joining of these panels to one another and to stub tubes on headers gives rise to difficulties. First the web is cut away between adjacent tubes for a distance of about 6″ so as to allow at least limited access all around the ends of the tubes to be welded. The spacing between adjacent tubes of a panel is generally only about ½″ and this makes it extremely difficult to ensure good welding from the outside. When a number of panels are closely juxtaposed, the problem is aggravated.

Known automatic welding torches cannot be used since they are too bulky to pass between adjacent tubes, and even if they could be miniaturized, the trailing supply tubes and wires which supply them could not easily be passed between the tubes.

Similar problems also exist in the construction of banks of closely pitched tubes.

The problem is solved in accordance with the invention by forming the torch as a clamp which can be caused to grip any desired tube and which carries an electrode holder which can be rotated about the axis of the tube by means carried by the clamp. Such a clamp can be made of very small radial dimensions so as to be accommodated in the spaces between adjacent tubes and the mechanism required for rotating the electrode holder can quite easily be accommodated within the body of such a clamp. Also since the clamp grips one of the tubes or tubular members which are being butt welded there is no necessity for both sides of the tube wall or the like to be accessible. Therefore the torch can be set up and used from one side only of a tube wall or the like.

It is undesirable for power leads, shielding gas supply tubes and the like to have to be rotated with the electrode holder either inside or outside the body of the clamp.

It is therefore an important feature of the invention to provide for the electrical supply to the electrode holder a brush and carbon ring or the equivalent, one of which is stationary and is incorporated in or attached to the body of the clamp, and to provide for the supply of shielding gas a system of passages between the rotatable electrode holder and the stationary clamp. With this arrangement feed conductors and pipes for current and gas do not have to be rotated with the electrode holder and can be accommodated in the small gap or space available by the simple expedient of choosing a suitable orientation of the clamp on the tube to be welded.

Once a torch in accordance with the invention has been used to give a good uniform root weld it can be removed and the weld completed by depositing weld metal to fill the weld preparation from for example a conventional hand-held consumable electrode torch. This can be done without major difficulties, even in the confined regions where adjacent tubes are closest, once a good root weld has been achieved.

Welding torches in accordance with the invention will now be described, by way of example, with reference to the accompanying diagrammatic drawings, in which:

FIGURE 1 is a diagram illustrating the joint between a tube panel and stub tubes on a header, and FIGURE 1A is a section on line 1A—1A of FIGURE 1;

FIGURE 2 is a view of one end of a torch showing it fitted between neighbouring tubes;

FIGURE 3 is one half of a section on the line III—III of FIGURE 2;

FIGURE 4 is a section on the line IV—IV of FIGURE 2;

FIGURE 5 is a view of the other end of the torch;

FIGURES 6, 6A and 6B are a detail section on the line VI—VI of FIGURE 3, an elevation of this section, and a section on the line VIB—VIB of FIGURE 6, respectively; and FIGURES 7 and 8 are views corresponding to FIGURES 3 and 4 of a modified form of torch.

A typical join between a header 10 and a tube panel 12 is shown in FIGURE 1. The header has welded to it a row of stub tubes 14 to which are to be welded the tubes 16 of the panel. The tubes 16 are joined to one another so as to constitute the panel by integral fins 18 which extend from diametrically opposed sides of the tubes and form a web. The spacing between the tubes 16, shown as y on FIGURE 1, is in general little more than ½″ and so it is very difficult to obtain access to the region where adjacent tubes are closest to ensure that a uniform penetration of the root of the butt weld between the tubes 14 and 16 is achieved right the way round their circumference. In order to make it at all possible to weld the tubes 14 and 16 the fins 18 are removed from between the tubes 16 near their ends in the region 20.

A welding torch 22 in accordance with the invention will fit around the tube 14 within the gap between adjacent tubes as shown diagrammatically in FIGURE 1. Alternatively the torch could be fitted around a tube 16.

Similarly if the welding torch is to be used in the construction of a bank of tubes which need not necessarily be tubes of a finned tube panel, the torch will be fitted around one tube or a stub tube already joined to a header.

The construction of one torch 22 will now be described in connection with FIGURES 2 and 6.

The torch comprises a stationary annular clamp 24 composed of two halves 24a and 24b which are held together by a threaded pin 26 pivotally mounted on the half 24a which passes through a bore 28 in the half 24b and has a nut 30 screwed onto its end. After being positioned around a tube 16, the nut 30 is tightened to hold the parts together and a further screw 31 is used to clamp the halves together. Spring steel channels 34 are provided in annular grooves 32 in the inner surface of the clamp to engage the tube 16 and hold it centrally and accommodate any irregularities in the outer surface of the tube. These spring steel channels can be replaced by a number of pads of rubber or like material which are spaced around the circumference of the grooves 32.

A sleeve 36 is positioned around part of the outer surface of the stationary clamp 24. Like the clamp 24, the sleeve 36 is formed in two halves 36a and 36b, so that after the clamp 24 has been positioned around a tube, the sleeve 36 can be placed around the clamp. The two halves 36a and 36b are held together by means shown more specifically in FIGURES 6, 6A and 6B. These means comprise threaded pins 45 pivotably mounted in recesses 46 in the half 36a. Grooves 47 are provided in the half 36b into which the pins can be swung so that nuts 48 threaded onto the pins lie within the outer surface of the sleeve 36 and hold the two halves together.

The sleeve 36 is rotatable relatively to the clamp and for this a worm drive 38 is provided. A worm wheel 40 driven by means not shown is arranged to rotate a worm 39 on the sleeve 36, and mounted in a trunnion block 41 which is itself pivotally mounted on the half 24b about a pivot point 42. The worm wheel is held in engagement with the worm 39 on the sleeve by means of a nut 43 threaded onto a pin 44 projecting from the half 24b. This allows the worm wheel to be engaged with the worm 39 once the sleeve 36 has been fitted around the clamp.

Mounted on the half 36b is an electrode block 49 which carries a non-consumable electrode 50. In this way rotation of the sleeve 36 orbits the electrode around the abutted ends of the tubes 14 and 16.

Between the block 49 and the half 36b is a nylon insulating ring 52 which electrically insulates the block from the sleeve 36. The block 49 comprises a carbon ring 54 supported by a ceramic coating 56. The electrode is held in the ring 54 by means of a screw 58.

Welding current is supplied to the ring 54 and the electrode through a carbon brush 60 on the end of an arm 62 which is carried by the half 36b and which presses the brush against the ring. The arm 62 is bolted to the half 36b by bolts 64, and insulating washers 66 insulate the half 36b from the arm. The current is supplied to the arm 62 through a conductor (not shown) in a tube 68 which also carries the supply of argon or other inert gas.

In order to supply argon to the region of the electrode, a tube 70 leads from the tube 68 to a hollow path 71 in the half 24b. From this hollow path a bore 72 supplies the argon to a ring-shaped groove 74 in the half 24b. This groove 74 is in communication with a groove 76 in the sleeve 36 from which a bore 78 through the half 36b and the rings 52 and 54 supplies the argon to the region of the electrode so that it flows out around the electrode and shields the region of the arc.

In order to make a weld the tubes 14 and 16 are aligned with one another after their ends which are to be welded have been prepared by tapering them. Then the clamp 24 is fitted around a tube 14 and the sleeve 36 is fitted around the clamp so that the electrode projects into the weld preparation at the join of the tubes. The worm drive 38 is set up and, after supplying argon to the region of the electrode, the sleeve is rotated and an arc is struck between the electrode and the tubes to weld the roots of the two tubes together.

Because the electrode is maintained at a constant angle and spacing to the tubes throughout the orbiting of the electrode around the tubes, the sleeve can be rotated at a constant speed to give a uniform root weld penetration all the way round the weld. The clamp and sleeve are thin enough to fit between adjacent tubes in the panels and there are no difficulties with trailing leads or conductors because these are led to the clamp at a position clear of the adjacent tubes in the panel. If two or more panels are closely juxtaposed, or the tubes form part of a bank of tubes it is still possible to use the torch since if a panel is positioned closely behind the panel shown in FIGURE 2 there will be room above the panel for the leads and the like, and vice versa, and one can set up and use the torch when there is access only from say in front of the row of tubes being welded.

After a weld the torch can be removed from the tube and the remaining groove at the join between the tubes filled by depositing weld metal from a conventional consumable electrode torch. Since problems of uniformity of penetration are not present the restricted access does not present any real problem.

The torch 100 shown in FIGURES 7 and 8 is very similar to the torch 22 shown in FIGURES 2 to 6 except that the arrangements for the supply of welding current and inert shielding gas are different.

As best shown in FIGURE 8, the welding current is supplied directly to a copper arm 101 at a connector 102, the arm 101 carrying a brush 60 in contact with a copper ring 104. The left hand end of the arm (as shown in FIGURE 8) is secured to a clamp 106 by bolts 108, and these bolts and the arm 101 are insulated from the clamp by nylon insulation 110. An electrode 112 is in contact with the ring 104 and is held in place by a grub screw 114. The ring 104 is insulated by means of an insulating ring 115, while the region around the electrode is heat shielded by means of a ceramic shield 116.

The connector 102 also serves for the connection to a supply of inert shielding gas. A stub pipe 117 mounted on one half 118a of a diametrically split ring 118 projects into the connector 102. The split ring 118 is slidably mounted in an annular recess 120 in a sleeve 122 rotatably mounted on the clamp 106 in a similar manner to the sleeve 36 described in connection with FIGURES 2 to 6. The split ring 118 slides within the recess 120 as the sleeve 122 is rotated and inert gas supplied to the connector 102 is fed into the recess 120. Felt pads 124 in the recess seal the ring and prevent substantial leakage of gas from the recess.

A passage 126 is provided in the sleeve 122 and one end is in communication with the recess 120 at the point 130 (FIGURE 7) where the felt pad is cut away, while the other end feeds the gas to one of a number of holes 132 spaced evenly around the electrode so as to supply the shielding gas directly to the region of the arc during welding.

The advantage of leading the gas directly to the sleeve 122 is that the path of the gas is considerably shortened and the construction of the clamp 106 is simplified.

We claim:

1. A non-consumable electrode welding torch for the external end to end butt welding of a pair of tubular members extending axially to each other comprising an annular clamp which can be caused to encompass and grip one of said pair of tubular members to be butt welded, said clamp having in its inner surface a pair of axially spaced annular grooves, resilient means provided in each of the annular grooves for engaging said one tubular member for supporting said clamp and holding it centrally on said one tubular member in accommodating any irregularities on the outer surface of said one tubular member, an electrode holder sleeve carried cantilevered over the abutted region of said tubular members by said clamp and rotatable about the axis of said tubular members and operably embracing said tube members in close proximity thereto, a non-consumable electrode held by said electrode holder sleeve, means for supplying welding current to said electrode, drive means carried by said clamp for rotating said electrode holder sleeve so as to orbit said electrode around the abutted region of the tubular members.

2. A torch according to claim 1 further comprising means for supplying inert shielding gas to said torch, and passage means for receiving said gas and directing it to the region of said electrode.

3. A non-consumable electrode welding torch for the external end to end butt welding of a pair of tubular members extending axially to each other comprising an annular clamp which can be caused to encompass and grip one of said pair of tubular members to be butt welded, said clamp having in its inner surface a pair of axially spaced annular grooves, resilient means provided in each of the annular grooves for engaging said one tubular member for supporting said clamp and holding it centrally on said one tubular member in accommodating any irregularities on the outer surface of said one tubular member, an electrode holder sleeve carried cantilevered over the abutted region of said tubular members by said clamp and rotatable about the axis of said abutted tubular members, and operably embracing said tube members in close proximity thereto, drive means for rotating said electrode holder sleeve, a non-consumable electrode carried by said holder in a position to enable an arc to be struck between it and the abutted ends of said tubular members, a supply terminal on said clamp insulated from said tubular members, means for supplying welding current to said supply terminal of said clamp, conductor means in electrical contact with said electrode and said supply terminal, passage means in said electrode holder sleeve having an outlet near said electrode and an inlet for receiving inert shielding gas, and means for supplying inert shielding gas to said inlet.

4. A torch according to claim 3 in which said conductor means comprise a brush carried by said clamp and in electrical contact with said electrical supply means, and an electrically conductive ring carried by said electrode holder in electrical contact with said electrode and said brush.

5. A torch according to claim 3 further comprising a first annular recess in said clamp, said means for supplying inert shielding gas being arranged to supply gas to said first recess, and a second annular recess in said electrode holder, said first and second recesses being in communication with said second recess, whereby gas fed to said clamp is supplied to near said electrode.

6. A torch according to claim 3 further comprising an annular recess in said electrode holder, said inlet to said passage means being in communication with said recess, a cover for said recess slidable around said recess so that said cover can remain stationary when said holder is rotated relatively to said clamp, inlet means carried by said clamp and extending through said cover, whereby inlet shielding gas supplied to said inlet means is fed to near said electrode.

7. A torch according to claim 3 in which said electrode holder comprises two diametrically split halves which are arranged to be fixed together around said clamp after said clamp has been fitted to said tubular member.

References Cited

UNITED STATES PATENTS

| | | | |
|---|---|---|---|
| 2,721,248 | 10/1955 | Kirkpatrick | 219—125 |
| 2,956,147 | 10/1960 | Baker | 219—125 |
| 2,985,746 | 5/1961 | Harmes | 219—125 |
| 3,035,147 | 5/1962 | Latter | 219—125 |
| 3,069,529 | 12/1962 | Gotch | 219—60.1 |
| 3,215,812 | 11/1965 | Smith | 219—125 |

FOREIGN PATENTS 1,039,570  8/1966  Great Britain.

JOSEPH V. TRUHE, Primary Examiner

L. A. SCHUTZMAN, Assistant Examiner

U.S. Cl. X.R.

219—60